(12) United States Patent
Nocciolini et al.

(10) Patent No.: US 7,784,181 B2
(45) Date of Patent: Aug. 31, 2010

(54) PROCESSING METHOD OF A SEMI-PROCESSED PRODUCT FOR THE PRODUCTION OF A ROTOR EQUIPPED WITH A SERIES OF BLADES INTEGRAL THEREWITH

(75) Inventors: Enzo Nocciolini, Sesto Fiorentino (IT); Roberto Ciappi, Montespertoli (IT)

(73) Assignee: Nuovo Pignone S.p.A., Florence (IT)

( * ) Notice: Subject to any disclaimer, the term of this patent is extended or adjusted under 35 U.S.C. 154(b) by 1242 days.

(21) Appl. No.: 11/328,350

(22) Filed: Jan. 9, 2006

(65) Prior Publication Data

US 2006/0156545 A1 Jul. 20, 2006

(30) Foreign Application Priority Data

Jan. 20, 2005 (IT) .......................... MI2005A0064

(51) Int. Cl.
*B23P 15/04* (2006.01)
(52) U.S. Cl. .................. 29/889.23; 29/889.4; 29/889.7; 29/557; 409/132
(58) Field of Classification Search ............ 29/888.024, 29/888.025, 889.4, 889.72, 557, 889.23, 29/889.7; 409/131, 132, 143, 199, 200; 82/1.2–1.5, 82/1.11, 11, 18
See application file for complete search history.

(56) References Cited

U.S. PATENT DOCUMENTS

| | | | |
|---|---|---|---|
| 3,811,163 A | 5/1974 | Frederick et al. | |
| 4,946,321 A | 8/1990 | Allemann et al. | |
| 6,491,482 B1 * | 12/2002 | Fenkl et al. .................. | 409/132 |
| 6,905,312 B2 * | 6/2005 | Bourgy et al. ................ | 416/234 |
| 7,305,762 B2 * | 12/2007 | Mola ...................... | 29/888.024 |
| 2003/0039547 A1 | 2/2003 | Bourgy et al. | |
| 2004/0184920 A1 | 9/2004 | Heinrich et al. | |

FOREIGN PATENT DOCUMENTS

| | | |
|---|---|---|
| DE | 3816674 A1 | 11/1989 |
| EP | 1 396 309 A | 3/2004 |
| GB | 548 282 A | 10/1942 |

* cited by examiner

*Primary Examiner*—David P Bryant
*Assistant Examiner*—Sarang Afzali
(74) *Attorney, Agent, or Firm*—Potomac Patent Group PLLC

(57) ABSTRACT

A processing method of a semi-processed product for obtaining a rotor equipped with a series of blades integral therewith by using a rotating tool such as a cutter, integral or with inserts. The processing method includes a) forming a hole into the semi-processed product; b) forming a series of cavities in the semi-processed product by removing material with the rotating tool to create the series of blades, starting from the hole and following predetermined paths; and c) removing material from the semi-processed product by advancing the rotating tool along its rotation axis and not removing material when the rotating tool advances along the predetermined paths. The rotation axis of the rotating tool is misaligned with respect to an axis of the hole.

14 Claims, 2 Drawing Sheets

PROCESSING METHOD OF A SEMI-PROCESSED PRODUCT FOR THE PRODUCTION OF A ROTOR EQUIPPED WITH A SERIES OF BLADES INTEGRAL THEREWITH

FIELD OF THE INVENTION

The present invention relates to a processing method of a semi-processed product for obtaining a rotor equipped with a series of blades integral therewith by means of chip-removing techniques.

DESCRIPTION OF BACKGROUND

The production method of said rotor refers in particular to a rotor produced in a single piece and comprising a central annular portion, and a series of radial blades connected and integral therewith.

Current methods for the production of said rotor for a compressor or turbine comprise the production of a series of cavities for producing the series of blades.

Said cavities are formed by trimming a starting semi-processed article such as, for example, a solid cylinder.

Trimming means a mechanical cutting operation in which a motorized tool progressively removes chips from said semi-processed article by means of a feeding movement in an orthogonal direction to the axis of the tool itself.

In other words, the material is progressively removed following a run which is orthogonal to the main axis of said motorized rotating tool.

One of the disadvantages of current production methods is that, by moving the motorized rotating tool in an orthogonal direction to the main axis, stress is created on the cutters of the motorized tool, which is such as to bend the tool itself.

This firstly causes processing tolerance errors of the semi-processed article which alter the final geometry of the rotor, consequently creating a deterioration in the aerodynamic characteristics of the rotor itself.

Furthermore, the bending of the tool causes vibrations on the machine on which the motorized tool is assembled with a consequent in crease in the processing errors of the rotor itself.

These methods therefore comprise the trimming or cutting phase of said semi-processed article according to a run which is orthogonal to the axis of said rotating tool.

This induces, however, stress on the semi-processed article causing defects which create a deterioration in the mechanical characteristics of the rotor blades.

BRIEF SUMMARY

An objective of the present invention is to provide a processing method of a semi-processed article for the production of a rotor which can be applied to a compressor or a turbine and which is made of a single piece with a series of blades thereof, which prevents the bending of the rotating tool for the formation of the rotor itself.

Another objective is to provide a processing method of a semi-processed article for the production of a rotor which can be applied to a compressor or a turbine and which is made of a single piece with a series of blades thereof, which allows a reduction in processing errors on the semi-processed article from which the rotor is obtained, also maintaining reduced processing times.

A further objective is to provide a processing method of a semi-processed article for the production of a rotor which can be applied to a compressor or a turbine and which is made of a single piece with a series of blades thereof, which allows the stress induced by chip removal mechanical operations to be reduced to the minimum.

Yet another objective is to provide a processing method of a semi-processed article for the production of a rotor which can be applied to a compressor or a turbine and which consists of a single piece with a series of blades thereof, which allows the production times and costs of the rotor itself to be reduced.

An additional objective is to provide a processing method of a semi-processed article for the production of a rotor which can be applied to a compressor or a turbine and which consists of a single piece with a series of blades thereof, which is simple and economical.

These objectives according to the present invention are achieved by providing a processing method of a semi-processed article for obtaining a rotor equipped with a series of blades integral therewith as specified in claim 1.

Further characteristics of the invention are indicated in the subsequent claims.

DESCRIPTION OF DRAWINGS

The characteristics and advantages of a processing method of a semi-processed article for obtaining a rotor equipped with a series of blades integral therewith according to the present invention will appear more evident from the following illustrative and non-limiting description, referring to the schematic drawings enclosed, in which.

DESCRIPTION OF THE EMBODIMENTS

Figure 1:
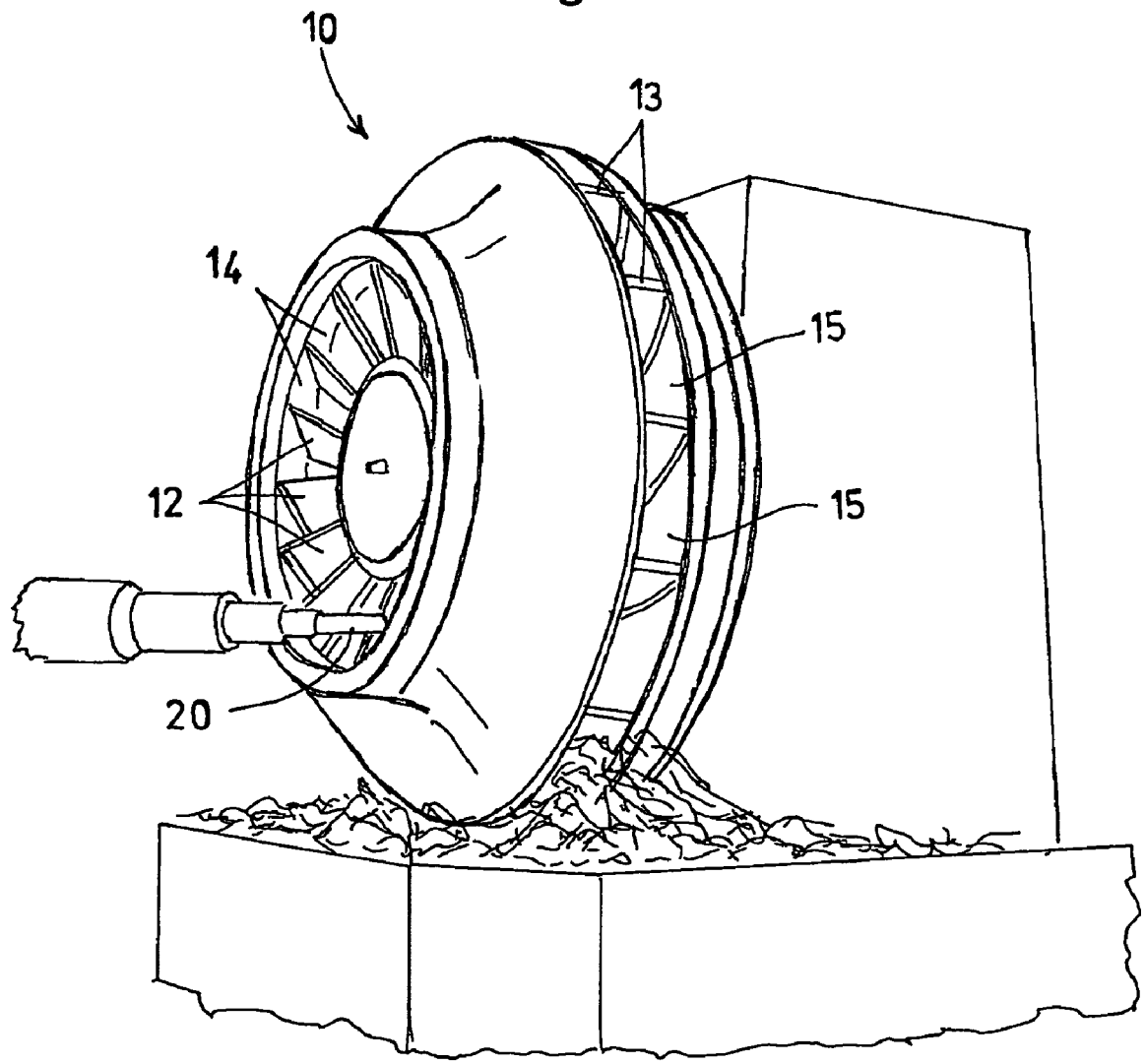
FIG. 1 is a raised right-side perspective view which shows a semi-processed article during its processing by means of a rotating tool for the production of a rotor of a compressor or turbine.
Figure 2:
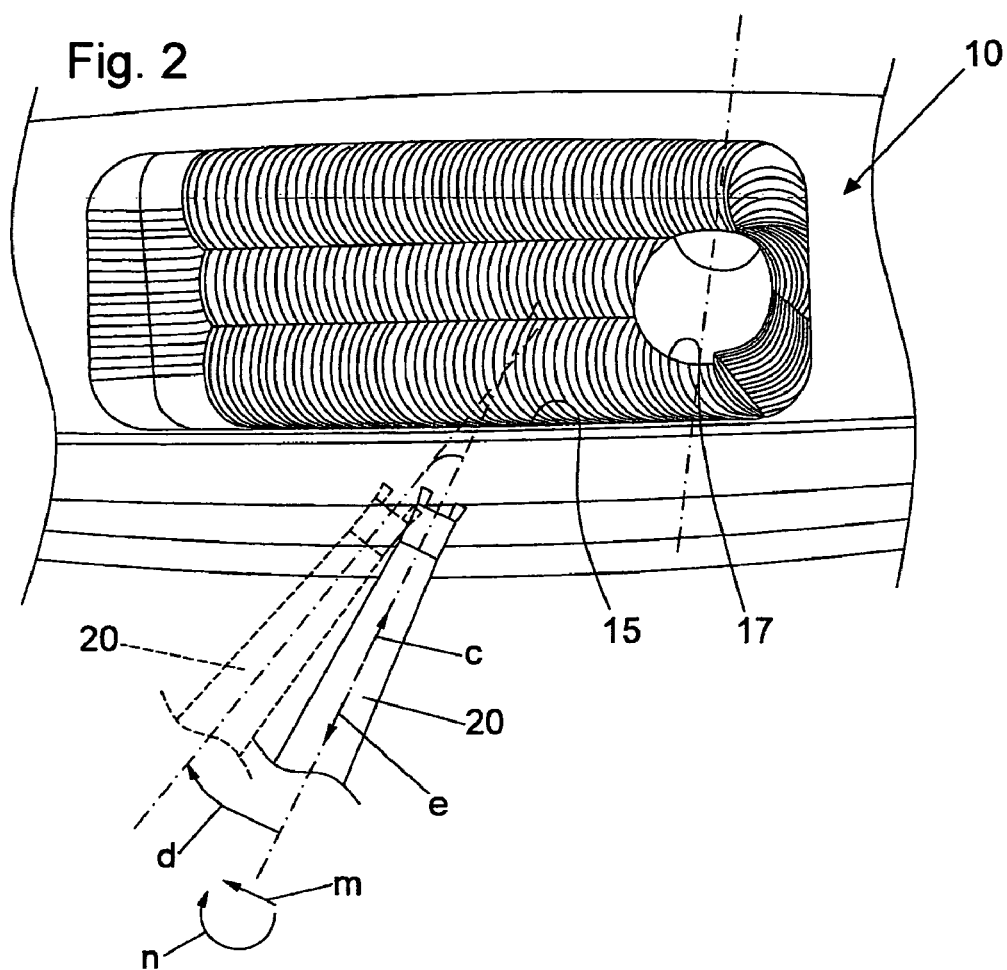
FIG. 2 is a raised right-side perspective view which shows a preferred production phase of a method for obtaining a rotor of a compressor or turbine according to the present invention.
Figure 3:
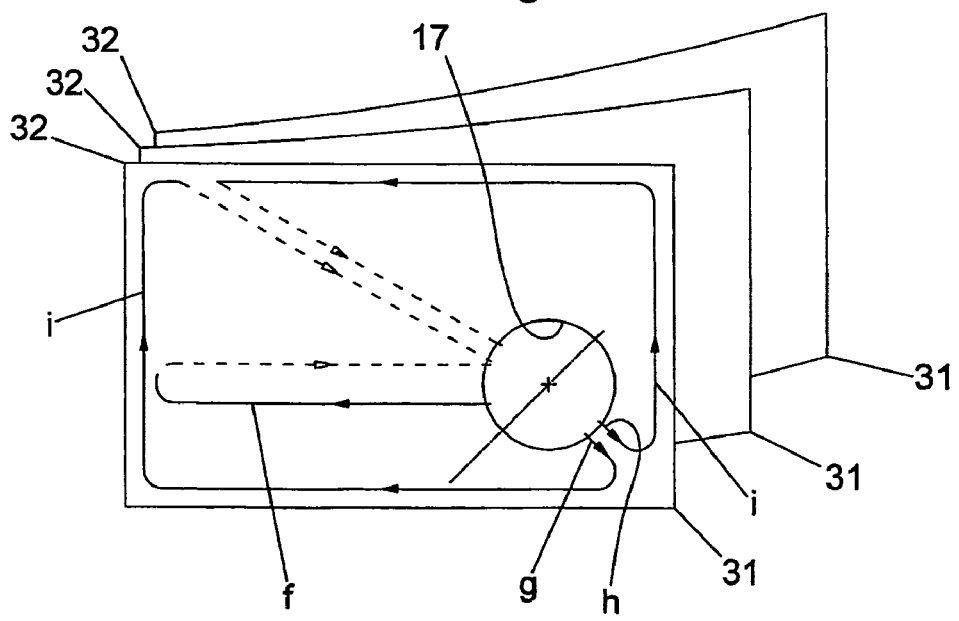
FIG. 3 is a schematic raised side perspective view of a preferred embodiment of a method for the production of a rotor according to the present invention.

With reference to the figures, a processing method is provided of a semi-processed article for obtaining a rotor 10 equipped with a series of blades 12 and 13 and integral therewith, by means of a rotating tool 20 such as a cutter, integral or with inserts, said processing method comprises phase a) forming a series of cavities 14 and 15 on said semi-processed product by means of said rotating tool 20 to create said series of blades 12 and 13.

Phase a) comprises phase b) forming a hole 17 in said semi-processed product and phase c) removing chips by advancing said rotating tool 20 along its rotation axis, said axis of said rotating tool being misaligned, preferably oblique, with respect to the axis of said hole.

Said phase c) also comprises phase d) misaligning said rotating tool 20 with respect to the axis of said hole 17.

In other words, said phase d) envisages positioning said rotating tool 20 so that this is misaligned with respect to the axis of said hole 17 by an angle preferably different with respect to the positioning of a previous phase d).

Said method also comprises phase e) moving said rotating tool backwards along its axis in a position prior to phase d), i.e. moving said rotating tool along its axis but in an opposite direction with respect to the advance direction used for removing the chips of phase c).

Said rotating tool is preferably a "plunge" cutter, i.e. a cutter capable of removing material by its axial advancing.

Said motorized rotating tool therefore preferably has cutters or inserts at its ends and is capable of removing a circular crown of material by its axial advancing.

In other words, said rotating tool is not capable of centrally removing material and it is therefore necessary to suitably position said tool to avoid interference of the central portion of the rotating tool with the surface of the semi-processed article.

According to a further embodiment of said method, said phase d) preferably comprises the following phases:

m) moving said tool orthogonal to its axis in a position close to said semi-processed article;

n) misaligning or further rotating said rotating tool with respect to said hole preferably with respect to a previous phase d).

This also allows a series of three-dimensional shaped profiles to be obtained from a solid semi-processed article, such as profiles under pressure and depression of the blades of a rotor 10, thus forming a rotor 10 of a turbine or a compressor equipped with a series of blades 12 and 13 and integral therewith.

Said phase c) preferably comprises the phase of creating a series of stepped surfaces, i.e. three-dimensional stepped surfaces, each of which has two opposite ends, a first end 31 radially more internal and close to said hole 17, and a second end 32 radially more external and distal with respect to said hole 17.

Each three-dimensional stepped surface preferably has four sides, substantially equal two-by-two, of which two opposite sides respectively define a portion of a profile under pressure of a first blade of said rotor and a portion of a profile in depression of a second blade of said rotor adjacent to the first.

In particular, said phase c) comprises the following phases:

at least one phase f) which envisages removing material starting from said hole 17 creating a series of steps radially extending from said hole 17 preferably advancing towards said second end 32 of said stepped surface;

a phase g) for removing material starting from said hole 17 and advancing so as to approach said first end 31 and then following the outline of said stepped surface extending from said hole 17 until reaching said second end 32 of said stepped surface;

phase h) for removing material starting from said hole 17 and advancing so as to approach said first end 31 and then following the outline opposite to phase g) of said stepped surface so as to extend from said hole 17 until reaching said second end 32 of said stepped surface.

Said phase g) and said phase h) preferably respectively comprise phase i) for defining a portion of profile of a surface under pressure or in depression of a blade or of said rotor.

Said method envisages repeating phases f), g) and h) to create a portion of a cavity of said rotor.

Said method also preferably comprises repeating phases a), b) and c) to obtain a remaining portion of said cavity of said rotor.

By removing material along the axis of said rotating tool, the bending of the rotating tool itself, is considerably reduced, and in this way, the advancing rates and passage depths of said motorized rotating tool can be consequently increased.

Furthermore, with an advancing movement along the axis of said motorized rotating tool, i.e. with a type of "plunge" processing, the stress and tension caused by thermal gradients which develop during the removal of the chips, due to the friction of the rotating tool with the portion of semi-processed article on which the chip removal is effected, are reduced.

It is therefore evident that by using said rotating tool such as a plunge cutter, it is possible to avoid its bending and consequently increase the cutting parameters.

By preventing the bending of the rotating tool, the processing times are also advantageously reduced as the cutting parameters can be in creased without increasing the processing errors.

At the same time, the processing costs due to the tools are reduced as the processing method allows a high useful life of the rotating tool.

There is consequently also an advantageous increase in the productivity of the tool used for the processing of the semi-processed product from which the corresponding rotor is obtained.

It can thus be seen that a processing method of a semi-processed tool for obtaining a rotor equipped with a series of blades integral therewith according to the present invention achieves the objectives specified above.

The processing method of a semi-processed article for obtaining a rotor equipped with a series of blades integral therewith thus conceived, can undergo numerous modifications and variants, all included in the same inventive concept.

Furthermore, in practice, the materials used as also the dimensions and components can vary according to technical demands.

The invention claimed is:

1. A processing method of a semi-processed product for obtaining a rotor equipped with a series of blades integral therewith by using a rotating tool such as a cutter, integral or with inserts, said processing method comprising:

a) forming a hole into said semi-processed product;

b) forming a series of cavities in said semi-processed product by removing material with said rotating tool to create said series of blades, starting from said hole and following predetermined paths; and c) removing material from said semi-processed product by advancing said rotating tool along its rotation axis and not removing material when said rotating tool advances along said predetermined paths, wherein said rotation axis of said rotating tool is misaligned with respect to an axis of said hole.

2. The method according to claim 1, wherein said phase c) comprises phase e) moving said rotating tool backwards along its axis prior to removing more material.

3. The method according to claim 2, wherein said phase c) comprises phase d) further misaligning said axis of said tool with respect to the axis of said hole after moving said rotating tool backwards along its axis.

4. The method according to claim 3, wherein said phase d) comprises phase m) moving said rotating tool in a direction orthogonal to its rotation axis further along said predetermined paths of said semi-processed product.

5. The method according to claim 3, wherein said phase d) comprises phase n) further misaligning said rotating tool by rotation of its axis with respect to said axis of said hole.

6. The method according to claim 1, wherein said phase c) comprises the following phases:

at least one phase f) for removing material starting from said hole and creating a series of steps radially extending from said hole and advancing towards said second end of said stepped surface;

a phase g) for removing material starting from said hole and advancing so as to approach said first end and then following the outline of said stepped surface extending from said hole until reaching said second end of said stepped surface; and phase h) for removing material starting from said hole and advancing towards said first end and then following the outline opposite to phase g) of said stepped surface so as to extend from said hole until reaching said second end of said stepped surface.

7. The method according to claim 6, wherein said phase g) and said phase h) respectively comprise phase i) for defining a portion of profile of a surface under pressure or in depression of a blade of said rotor.

8. The method according to claim 6, further comprising repeating said phases f), g) and h) to form a portion of a cavity of said rotor.

9. The method according to claim 6, further comprising repeating said phases a), b) and c) to obtain a remaining portion of a cavity of the series of cavities of said rotor.

10. The method according to claim 1, wherein said phase c) comprises a phase of creating a series of three-dimensional stepped surfaces each of which has two opposite ends, a first end radially more internal and close to said hole, and a second end radially more external and distal with respect to said hole.

11. The method according to claim 10, wherein each three-dimensional stepped surface has four sides, two-by-two substantially equal, of which two opposite sides respectively define a portion of a profile under pressure of a first blade of said rotor and a portion of a profile in depression of a second blade of said rotor adjacent to the first.

12. The method according to claim 1, further comprising;
after forming said hole, plunging said rotating tool along it axis into said semi-processed product to remove material, the axis of the rotating tool being misaligned with the axis of the hole, while not moving said rotating tool along said predetermined paths;
after removing a predetermined material along its axis, removing said rotating tool backwards along its axis;
displacing said rotating tool along one of said predetermined paths without removing material; and
repeating the above steps to further remove material.

13. The method according to claim 12, further comprising;
changing the misalignment between the axis of said rotating tool and said hole after each step of removing.

14. The method according to claim 12, further comprising;
removing material with a front face of said rotating tool except a central region of said front face.

* * * * *

UNITED STATES PATENT AND TRADEMARK OFFICE
CERTIFICATE OF CORRECTION

| | | |
|---|---|---|
| PATENT NO. | : 7,784,181 B2 | |
| APPLICATION NO. | : 11/328350 | |
| DATED | : August 31, 2010 | |
| INVENTOR(S) | : Nocciolini et al. | |

It is certified that error appears in the above-identified patent and that said Letters Patent is hereby corrected as shown below:

In Column 1, Line 42, delete "in crease" and insert -- increase --, therefor.

In Column 4, Line 8, delete "in creased" and insert -- increased --, therefor.

In Column 6, Line 7, in Claim 12, delete "comprising;" and insert -- comprising: --, therefor.

In Column 6, Line 8, in Claim 12, delete "along it" and insert -- along its --, therefor.

In Column 6, Line 18, in Claim 13, delete "comprising;" and insert -- comprising: --, therefor.

In Column 6, Line 21, in Claim 14, delete "comprising;" and insert -- comprising: --, therefor.

Signed and Sealed this
Eleventh Day of January, 2011

David J. Kappos
*Director of the United States Patent and Trademark Office*